UNITED STATES PATENT OFFICE.

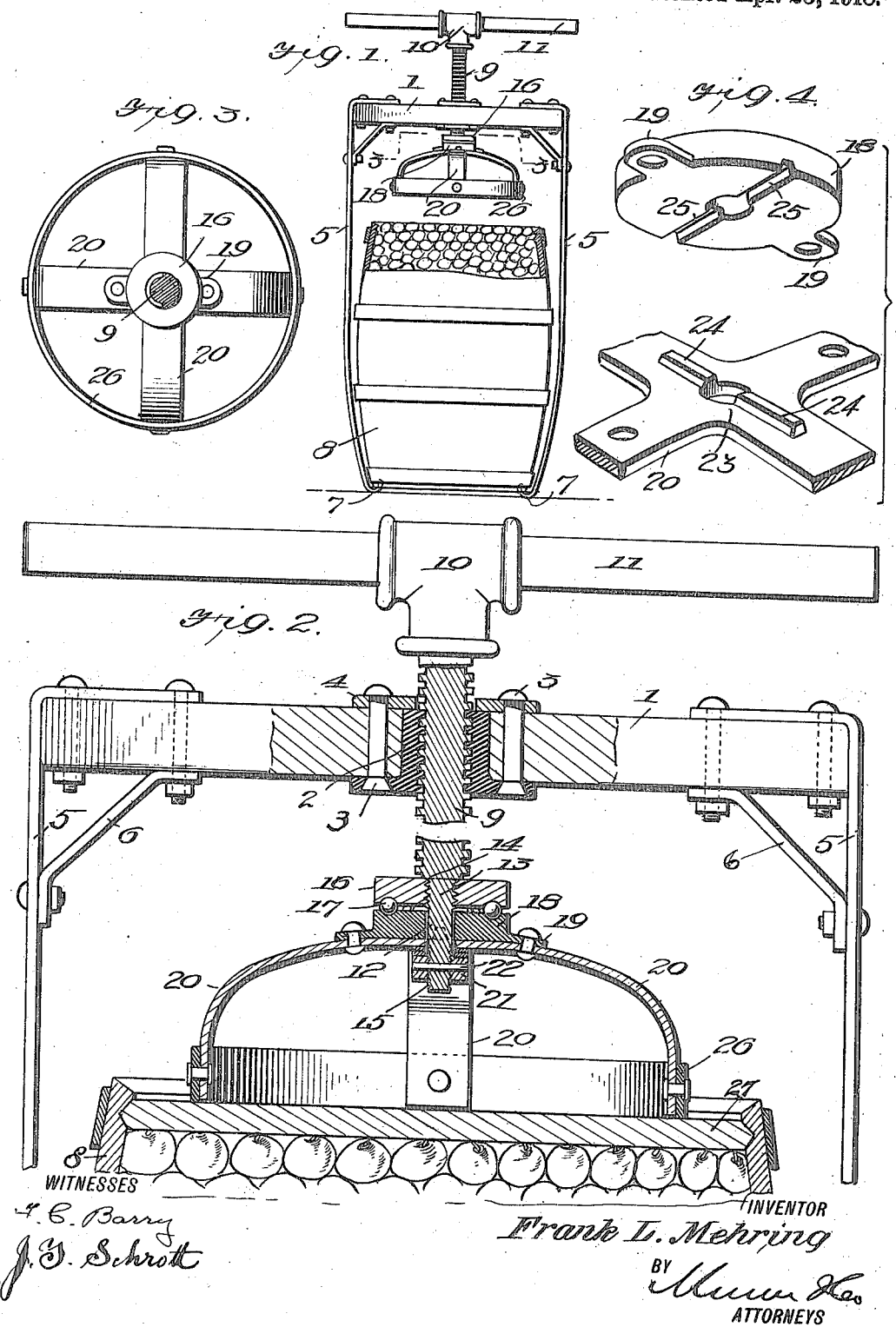

FRANK L. MEHRING, OF CHARLOTTESVILLE, VIRGINIA.

BARREL-HEAD PRESS.

1,263,786. Specification of Letters Patent. Patented Apr. 23, 1918.

Application filed December 15, 1917. Serial No. 207,345.

*To all whom it may concern:*

Be it known that I, FRANK L. MEHRING, a citizen of the United States, and a resident of Charlottesville, in the county of Albemarle and State of Virginia, have invented a new and useful Improvement in Barrel-Head Presses, of which the following is a specification.

My invention relates to improvements in barrel head presses, and it consists in the constructions, combinations and arrangements herein described and claimed.

An object of my invention is to provide a barrel head press, including as one of its essential features, the novel construction of follower with the resilient follower arms, and the ball bearing on the screw shaft.

Another object of the invention resides in the manner of mounting the follower and the ball bearing disks, on the screw shaft.

Other objects and advantages will appear in the following specification, reference being had to the accompanying drawing, in which:

Figure 1 is a side elevation showing the device applied to a barrel, a portion of the barrel being shown in section.

Fig. 2 is an enlarged sectional view,

Fig. 3 is a cross section on the line 3—3 of Fig 1, and

Fig. 4 is a detail view showing the engaging members on the resilient follower arms and the bottom disk.

In carrying out my invention, I provide a bridge 1 which has a bushing 2 in the center, and is secured in position by the bolts or rivets 3 which also include the binding plate 4 on the upper surface of the bridge 1. Spring arms 5 are attached to the ends of the bridge 1, and have additional support in the braces 6, the means for securing the arms and the braces to the bridge, being arranged substantially as shown. The spring arms 5 terminate in hooks 7 on the bottom, for engaging the lower chine of the barrel 8.

A screw shaft 9 occupies the threaded bore of the bushing 2, and has a head 10 at the top, through which a handle 11 is thrust. The screw shaft 9 has a smooth shank 12 near the lower end. A threaded enlargement 13 is located between the shank 12 and a shoulder 14 at the bottom of the screw shaft. The shank 12 is threaded at 15 on the lower end.

The top disk 16 of a ball bearing is screwed on the enlargement 13 until it binds against the shoulder 14, whereupon the disk is firmly held in position. Ball bearings 17 lie between the top disk 16 and a bottom disk 18 which includes lugs 19 through which rivets pass, and secure the resilient follower arms 20 to the bottom disk.

A nut 21 is screwed upon the threaded portion 15 of the shank, and is held in place by a pin 22 which passes through the nut and shank. Spacing washers are slipped on the shank 12 between the nut and the follower arms. The bottom disk 18 has a smooth bore which is occupied by the smooth portion of the shank 12.

The bottom disk 18 and the resilient follower arms 20 are additionally bound together by a feather and groove connection. The resilient arms 20 are preferably stamped or cast from one piece in the shape of a cross, thus providing a central solid portion 23 on which the feathers 24 are formed. These feathers fit into grooves 25 on the lower surface of the disk 18. Relative turning of the disk 18 on the follower arms is prevented by this connection.

The free ends of the follower arms 20 are bound together by a follower ring 26, which is adapted to engage the head of the barrel, when the head is to be pressed into position as shown in the drawing.

The operation of the device is as follows: The spring arms 5 are first hooked over the lower chine of the barrel, and the follower occupies the normally elevated position so that the head of the barrel may be readily placed in position on the contents of the barrel. The follower is then screwed down until the ring 26 meets the head. Continued turning of the screw shaft 9, presses the head down until it springs in place in the annular groove near the upper edge of the barrel.

There is an advantage in making the follower arms 20 resilient, to a certain degree. The degree of resiliency will of course be greater when the follower arm piece is stamped from a sheet of metal. The follower arms will possess a lesser degree of resiliency, when the piece is cast. In any event, there is a certain degree of resiliency in the arms 20, and this resiliency permits the follower ring 26 to conform to any inequalities in the head 27. For instance, the head 27 may not be perfectly horizontal, but may slant at such an angle that were the mounting of the follower ring rigid, only one point on the head would be pressed upon, and so the proper seating of the head in the groove would become uncertain.

This explanation of course leads to the understanding of the value of resilient arms which, as pointed out above, cause the follower ring to adjust itself to unequal positions of the head and yet permit the free turning of the top ball bearing disk. The provision of the ball bearing between the screw shaft and the follower, is novel in devices of this kind. Obviously, the device may be operated with less effort than formerly, and consequently in less time.

I claim:

1. In a barrel head press, a screw shaft, a bearing including top and bottom disks carried by the screw shaft, a follower comprising a cross-shaped piece including a solid mid portion secured to the bottom disk and resilient arms radiating from the mid portion, and a follower ring embracing the free ends of the arms.

2. In a barrel head press, a screw shaft having a reduced threaded portion leaving a shoulder, and a reduced shank extending from the said threaded portion, the shank including a smooth portion and a threaded extremity, a top bearing disk screwed into binding engagement with said shoulder, a bottom bearing disk having a bore occupied by the smooth shank portion, and having lugs, a follower including a piece with a solid mid portion secured to the bottom of the bottom disk and resilient bow-shaped arms radiating from said mid portion, nut and washer devices with a securing pin on the threaded shank portion, and a follower ring embracing the free ends of said arms.

3. In a barrel head press, a screw shaft having a reduced threaded portion leaving a shoulder, and a reduced shank extending from the said threaded portion, the shank including a smooth portion and a threaded extremity, a top bearing disk screwed into binding engagement with said shoulder, a bottom bearing disk having a bore occupied by the smooth shank portion and grooves communicating with the bore, a follower including a piece with a solid mid portion secured to the bottom disk, with feathers occupying the grooves and bow-shaped arms radiating from said mid portion, nut and washer devices with a securing pin on the threaded shank portion, and a follower ring embracing the free ends of said arms.

FRANK L. MEHRING.

Witnesses:
H. I. BOWLES,
R. O. JOHNSON.

Copies of this patent may be obtained for five cents each, by addressing the "Commissioner of Patents, Washington, D. C."